3,057,860
1α,11α-EPOXY-3β,5,14,19,21-PENTAHYDROXY-5β,14β-PREGNANE-(20)-ONE

Christoph Tamm, Riehen, Switzerland, and Gert Volpp, Cambridge, Mass., assignors to Sandoz Ltd., Basel, Switzerland
No Drawing. Filed Dec. 26, 1961, Ser. No. 162,189
Claims priority, application Switzerland Dec. 30, 1960
1 Claim. (Cl. 260—239.55)

The present invention relates to a novel 1α,11α-epoxy-3β,5,14,19,21-pentahydroxy - 5β,14β - pregnane-(20)-one of the corticosteroid series and to a method for its manufacture, said compound having the formula

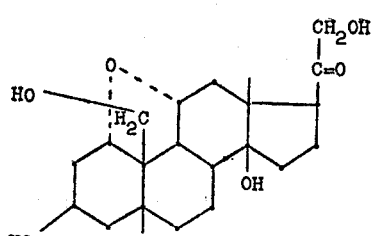

(III)

GENERAL METHOD OF PREPARATION

To prepare the Compound III, 1α,11α-epoxy-3β,19-diacetoxy - 5,14 - dihydroxy-carden-(20:22)-olide of the formula

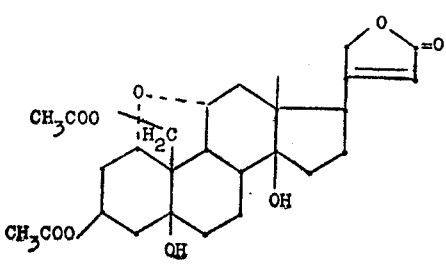

(II)

is subjected to ozone degradation.

The Compound II may be obtained from monoanhydro-ouabagenin of Formula I

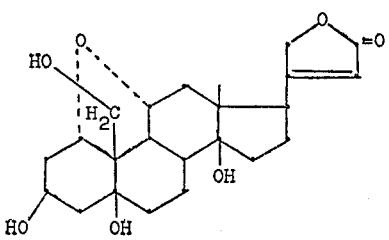

(I)

in accordance with a method known to acetylate hydroxy groups of steroids other than tertiary ones.

It is surprising that the epoxy radical in the 1α,11α-position of Compound II is not affected by the ozone degradation.

Compound III contains the ketol side chain typical of the corticosteroids, which are useful for electrolyte regulation in sera, carbohydrate metabolism regulation and treatment of rheumatic, inflammatory and allergic conditions, and may be used as an intermediate compound in the production of other steroids.

Monoanhydro-ouabagenin (i.e. 1α,11α-epoxy-3β,5,14,19-tetrahydroxy-carden-(20:22)-olide or 1α,11α-epoxy-strophanthidol) may be produced by treating ouabain or 1,19-isopropylidene-ouabagenin with dilute hydrochloric acid in aqueous alcohol, or by splitting off water from ouabagenin with dilute hydrochloric acid in aqueous ethanol as described in the following.

(a) *Monoanhydro-Ouobagenin (1α,11α-Epoxy-3β,5,14, 19-Tetrahydroxy-Carden-(20:22)-Olide; 1α,11α-Eoxy-Strophanthidol) from 1,19-Isopropylidene-Ouabagenin*

6.0 g. of 1,19-isopropylidene-ouabagenin having a melting point of 282–288° are boiled at reflux for one hour with 600 cc. of 96% ethanol containing 3.5 cc. of HCl (=0.05 N. HCl). The mixture is then evaporated to dryness in a vacuum and the residue crystallised from methanol/ether. 1.90 g. of crystalline monoanhydro-ouabagenin having a melting point of 262–275° result. After recrystallisation from methanol/ether needles having a melting point of 274–275° (decomposition) and [306–315° (decomposition) (Kofler Block)];

$$[\alpha]_D^{22} = +46° \pm 2°$$

(c=0.467 in methanol). A solution in methanol-chloroform does not give a yellow colouration with tetranitromethane. IR-spectrum (KBr) bands at approximately 2.93μ (OH), 5.54μ and 5.76μ (C=O, butenolide ring) 6.20μ (C=C, butenolide ring). The mother liquor residues (2.3 g.) are chromatographed on 69 g. of Al₂O₃. For the purpose of washing 230 cc. of solvent per fraction are used. Fraction 1 (eluted with chloroform/methanol-(99:1)] yields 12 mg. of amorphous material. Fraction 2 [591 mg. eluted with chloroform/methanol-(99:1)] yields 168 mg. of tetraanhydro-ouabagenin having a melting point of 121–130°, which crystallises slowly from methanol/ether. The fractions 3–14 [eluted with chloroform/methanol-(99:1), (98:2) and (97:3)] yield 903 mg. of amorphous material. The fractions 15–25 [656 mg. eluted with chloroform/methanol-(95:5), (90:10) and (80:20)] yield 396 mg. of crystalline monoanhydro-ouabagenin having a melting point of 286–301° from methanol/ether.

(b) *Monoanhydro-Ouabagenin From Ouabagenin*

104 mg. of ouabagenin having a melting point of 240–250° (paper chromatographically pure) are boiled at reflux with 5 cc. of 96% ethanol containing 0.03 cc. of concentrated hydrochloric acid for half an hour. The residue resulting after evaporation in a vacuum yields 44 mg. of crystalline monoanhydro-ouabagenin having a melting point of 270–276° (decomposition) from methanol/ether. From the mixed melting point and paper chromatography it is seen that this compound is identical with that obtained in section (a).

The process may for example, be effected as follows: Compound I is converted to Compound II with acetanhydride in pyridine, Compound II then being subjected to ozone degradation, e.g. by treating successively with ozone, Zn-glacial acetic acid, and KHCO₃, Compound III resulting. In the following non-limitative, illustrative example all temperatures are stated in degrees centigrade. The melting points are corrected.

EXAMPLE (a) *Di-O-Acetyl-Monoanhydro-Ouabagenin From Monoanhydro-Ouabagenin*

1.79 g. of monoanhydro-ouabagenin having a melting point of 289–296° are left to stand with 17 cc. of pyridine and 17 cc. of acetic acid anhydride for two days at 22°. After the addition of chloroform the mixture is washed with a 2 N HCl, 2 N Na₂CO₃ and water, dried over Na₂SO₄ and evaported in a vacuum. The residue yields 1.71 g. of crystals having a melting point of 226–230° from methanol-ether. After recrystallization from methanol-ether or acetone-ether needles having a melting point of 232–233° result; $[\alpha]_D^{22} = +44° \pm 2°$ (c.=1.097 in chloroform). $Rf=0.14$ in the system formamide/benzene-chloroform-(7:5). A solution in chloroform does not give a yellow colouration with tetranitromethane. Drying for the purpose of analysis: 5 hours at 100° and 0.02 mm. of Hg.

(b) *Ozone Degradation of Di-O-Acetyl-Monoanhydro-Ouabagenin*

Oxygen containing ozone is passed through a solution of 1.51 g. of di-O-acetyl-monoanhydro-ouabagenin having a melting point of 232–233° in 175 cc. of ethyl acetate for 17 minutes at —80°. After evaportion in a vacuum at 20° the crude ozonide is dissolved in 30 cc. of glacial acetic acid and a total of 2 g. of Zn dust added portionwise whilst cooling, potassium iodide starch paper no longer giving a blue colour. After filtration and evaporation in a vacuum the residue is taken up in chloroform, the solution washed with a 2 N $Na_2CO_3$ solution and water, dried over $Na_2SO_4$ and evaporated. The crude product (1.5 g.) is dissolved in 80 cc. of methanol and left to stand with 40 cc. of a 3% aqueous $KHCO_3$ solution for 18 hours at 20°.

After bringing the mixture to a pH value of 7 with HCl and removal of the methanol in a vacuum the aqueous solution is shaken with chloroform and chloroform/ethanol-(4:1). After washing with a little water, drying over $Na_2SO_4$, 580 mg. of chloroform extract result, showing 5 spots (A, B, C, D and E) in the thin layer chromatogram [system chloroform/methanol-(9:1)] but which could not be brought to crystallise, as well as 620 mg. of chloroform/ethanol-(4:1) extract, which shows 3 spots (D, E, F) in the thin layer chromatogram. The latter extract yields 135 mg. of crystals having a melting point of 201–205° from acetone-ether. Upon recrystallization free ketol III (spot F) results in the form of prisms having a melting point of 201–202°; $[\alpha]_D^{21} = +60° \pm 2°$ (c.=1.182 in methanol). Rf value [in the thin layer chromatogram system of chloroform/methanol-(9:1)]: 0.36. UV spectrum: $\lambda_{max}=280$ m$\mu$; log $\epsilon=1.69$ (ethanol). In the IR spectrum (KBr) bands at 2.73$\mu$ (OH) and 5.88$\mu$ (C=O, 20 ketone). No acetyl bands.

Having thus disclosed the invention what is claimed is:

$1\alpha,11\alpha$-epoxy - $3\beta,5,14,19,21$ - pentahydroxy-$5\beta,14\beta$-pregnane-(20)-one of Formula III

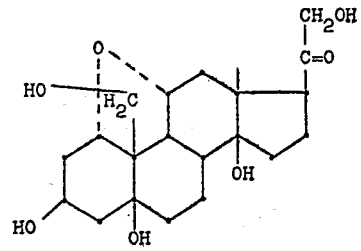

(III)

References Cited in the file of this patent

UNITED STATES PATENTS 2,923,709     Colton _____ Feb. 2, 1960

OTHER REFERENCES

Kalvoda et al.: Helvetica Chimica Acta, vol. 44, 1961, pages 186–198.